(12) United States Patent
Dickrede

(10) Patent No.: US 8,844,941 B1
(45) Date of Patent: Sep. 30, 2014

(54) ADAPTOR FOR HOLDING A THREADING DEVICE

(76) Inventor: Ronald W. Dickrede, Delphos, OH (US)

( * ) Notice: Subject to any disclaimer, the term of this patent is extended or adjusted under 35 U.S.C. 154(b) by 605 days.

(21) Appl. No.: 12/803,489

(22) Filed: Jun. 29, 2010

(51) Int. Cl.
*B23G 1/46* (2006.01)
*B23B 31/165* (2006.01)
*B23B 31/20* (2006.01)

(52) U.S. Cl.
USPC .................. 279/42; 279/143; 279/36; 81/113

(58) Field of Classification Search
CPC .... B23B 2231/54; B23G 1/261; B23G 1/262; B23G 1/267
USPC .......... 408/238, 239 R, 240; 279/143, 36, 42, 279/56; 407/207, 198, 103; 81/114
See application file for complete search history.

(56) References Cited

U.S. PATENT DOCUMENTS

| | | | | |
|---|---|---|---|---|
| 1,392,705 | A * | 10/1921 | Rhodes | 408/154 |
| 2,141,786 | A * | 12/1938 | Helgerud | 408/140 |
| 2,684,491 | A | 7/1954 | Roddick | |
| 2,902,358 | A * | 9/1959 | Kalling et al. | 75/527 |
| 2,940,765 | A * | 6/1960 | Appleby | 279/16 |
| 3,350,731 | A * | 11/1967 | Benjamin | 408/139 |
| 3,553,753 | A * | 1/1971 | Hundley | 470/96 |
| 3,645,642 | A * | 2/1972 | Koslow | 408/202 |
| 4,087,195 | A * | 5/1978 | Wood | 408/240 |
| 4,111,591 | A * | 9/1978 | Rolnick | 408/117 |
| 4,687,384 | A * | 8/1987 | McCoy | 408/10 |
| 5,167,476 | A * | 12/1992 | Lafferty et al. | 408/240 |
| 5,213,347 | A * | 5/1993 | Rulon et al. | 279/102 |
| 5,343,787 | A * | 9/1994 | McDonnell | 82/110 |
| 5,398,946 | A | 3/1995 | Quiring | |
| 5,586,847 | A | 12/1996 | Mattern, Jr. et al. | |
| 5,876,158 | A * | 3/1999 | Beiter | 408/139 |
| 5,938,212 | A * | 8/1999 | Wadsworth | 279/42 |
| 6,543,959 | B1 | 4/2003 | Jore | |
| 6,997,654 | B2 * | 2/2006 | Blick | 408/121 |
| 7,334,970 | B2 | 2/2008 | Kozak | |
| D594,306 | S * | 6/2009 | Decker | D8/70 |
| 8,302,708 | B1 * | 11/2012 | Cox et al. | 175/300 |
| 2007/0082746 | A1 * | 4/2007 | Rigdon | 470/82 |
| 2007/0172318 | A1 * | 7/2007 | Petrillo | 407/29 |

FOREIGN PATENT DOCUMENTS

CN     201009018 Y  *  1/2008
DE       3806060 A  *  9/1989

* cited by examiner

*Primary Examiner* — Eric A Gates
*Assistant Examiner* — Paul M Janeski
(74) *Attorney, Agent, or Firm* — Richard L Miller

(57) ABSTRACT

An adaptor for holding a threading device to a chuck of a power tool, with the chuck having three jaws. The adaptor comprises a shank having three flat sides, wherein each flat side of the chuck cooperates with a corresponding jaw of the chuck.

1 Claim, 7 Drawing Sheets

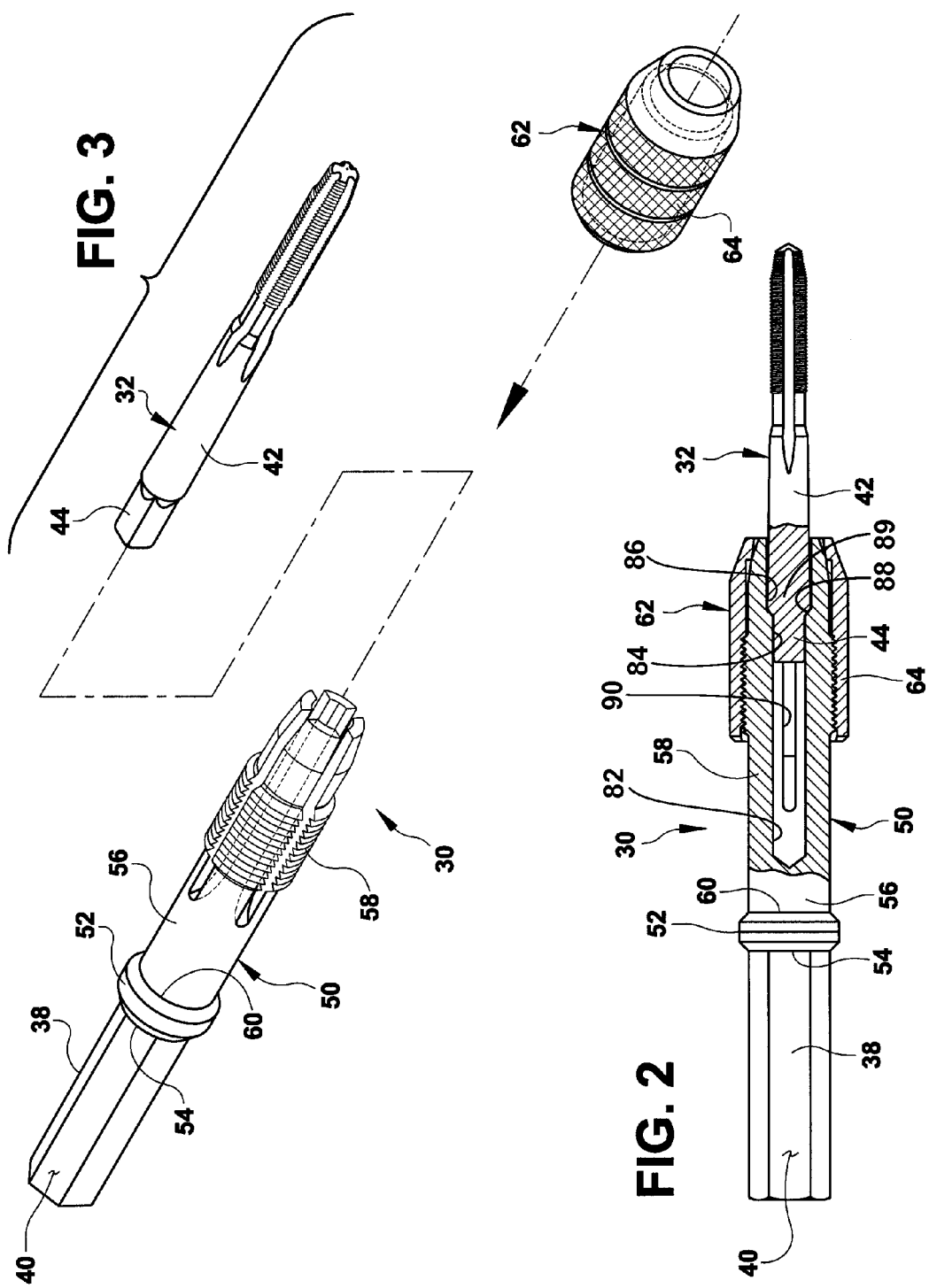

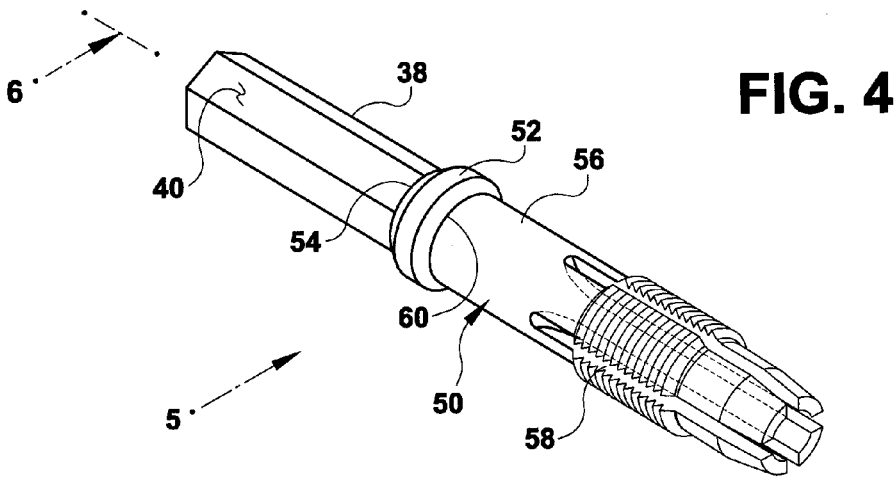
FIG. 4
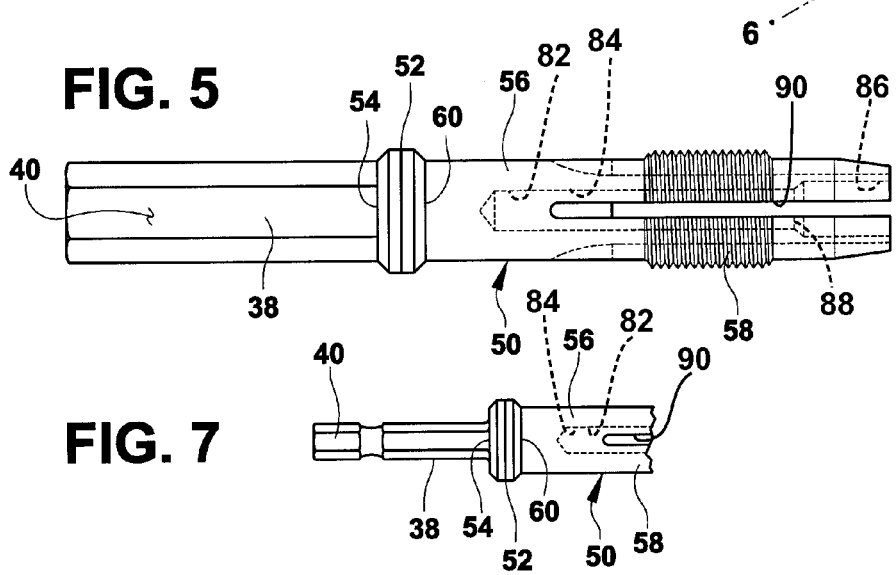
FIG. 5
FIG. 7
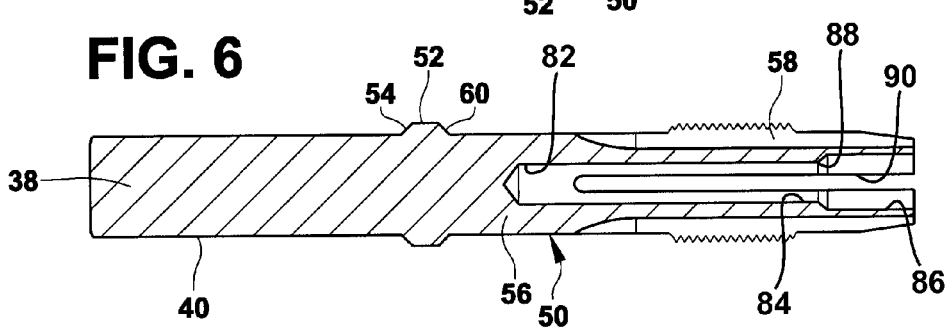
FIG. 6

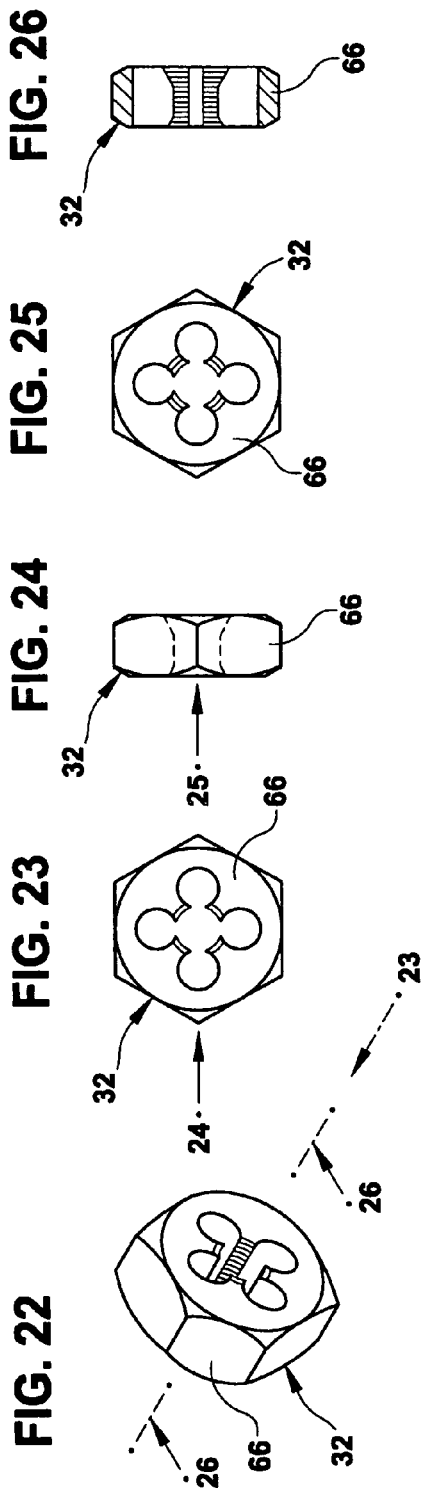
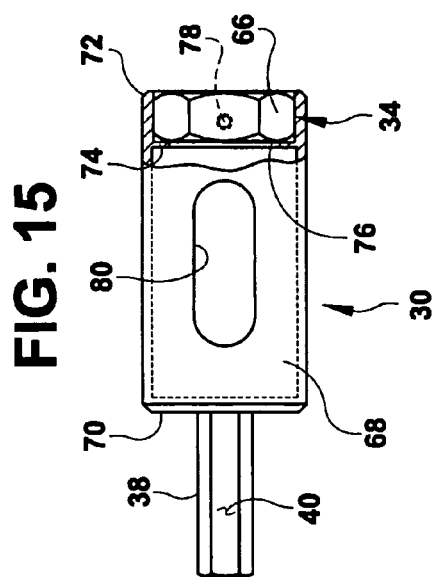
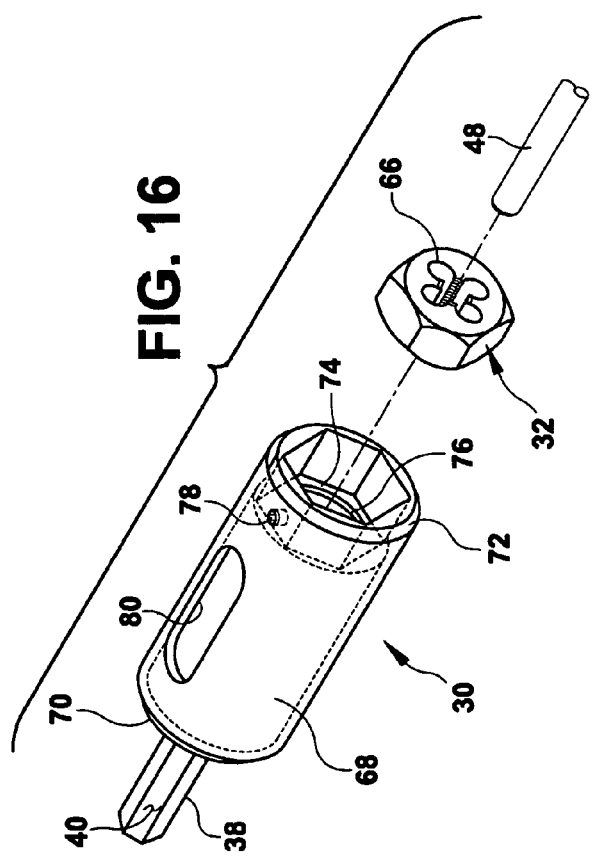

FIG. 17
FIG. 18
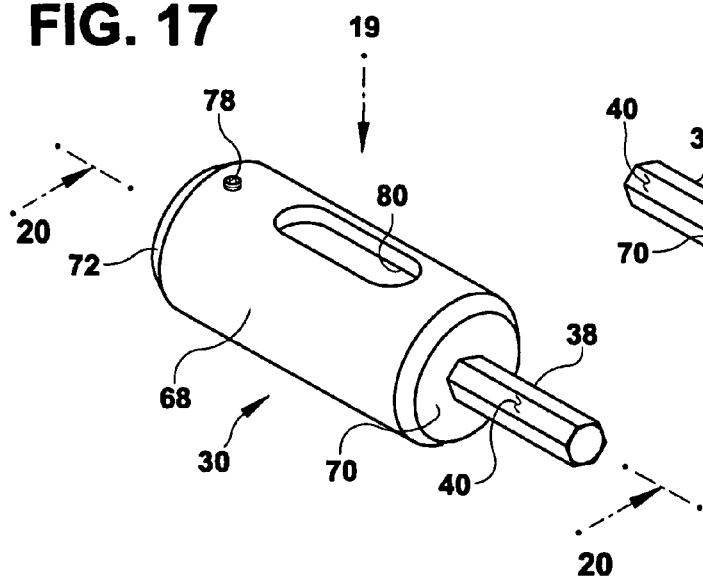
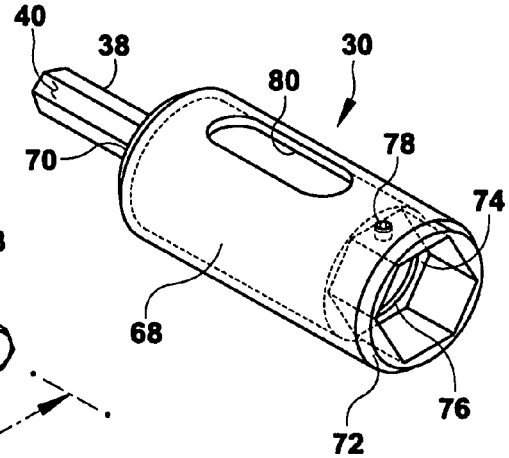
FIG. 19
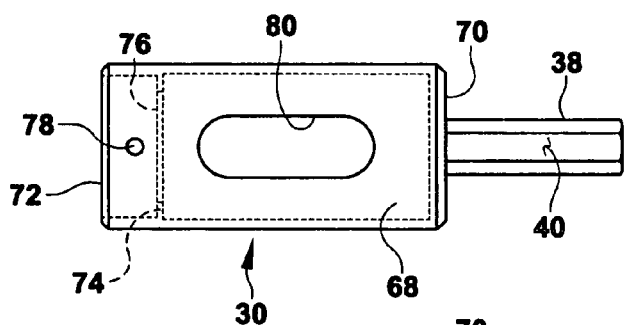
FIG. 21
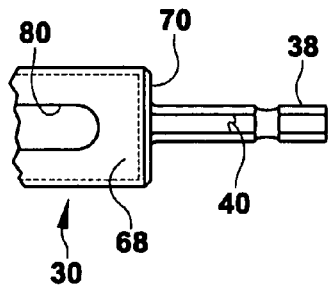
FIG. 20
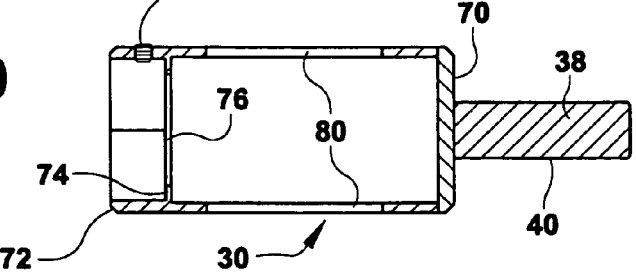

ADAPTOR FOR HOLDING A THREADING DEVICE

BACKGROUND OF THE INVENTION

1. Field of the Invention

The present invention relates to a tool holder for a power drill, and more particularly, an adaptor for holding a threading device.

2. Description of the Prior Art

Numerous innovations for tap holding adaptors for power tool chucks have been provided in the prior art that will be described. Even though these innovations may be suitable for the specific individual purposes to which they address, however, they differ from the present invention.

A FIRST EXAMPLE, U.S. Pat. No. 2,684,491, Issued on Jul. 27, 1954, to Roddick teaches an automatic releasing tool holder comprising a shank, a spindle, tool mounting means on the spindle, the shank having an opening in the bottom thereof into which one end of the spindle extends, the spindle having recesses therein each receiving a ball, the shank having holes through the side thereof through which the balls may move, a sleeve surrounding the shank, means mounting the sleeve for limited movement relative to the shank, cam means on the sleeve, the cam means holding the balls within the recesses in the spindle in one position of the sleeve, means mounting the spindle and shank for limited longitudinal movement relative to each other, the cam means being positionable in the extended position of the shank and spindle relative to each other to permit the balls to move outwardly and disengage the recesses in the shank.

A SECOND EXAMPLE, U.S. Pat. No. 5,398,946, Issued on Mar. 21, 1995, to Quiring teaches a chuck device having a one-step lock and release mechanism for conveniently coupling a power bit to a drill having a Jacobs-style chuck. The chuck device includes a body having a centrally-positioned bore which is adapted to receive the power bit shank. The power bit shank includes a circumferentially-extending groove which is positioned inside the bore. The body has an inclined cam channel which includes an aperture for communicating with the bore. The body further includes a longitudinally-extending slot communicating with the inclined cam channel. A detent ball is disposed within the inclined cam channel for partial penetration through the aperture for engaging the circumferentially-extending groove of the power bit shank. A spring having an end encircles the body where the end is slidably positioned within the slot for biasing the detent ball rearwardly along the inclined cam channel during the unlocking and withdraw of a power bit from the chuck device. The position of the spring is confined on the body by a retaining ring positioned proximate to the inclined cam channel and by a sleeve which encircles a portion of the body. The retraction of the sleeve in a rearward direction compresses the spring and rearwardly biases the spring end within the slot for movement of the detent ball from locking engagement to the circumferentially-extending groove. Release of the sleeve permits the expansion of the spring and the biasing of the sleeve and detent ball in a forward direction for locking engagement to a power bit.

A THIRD EXAMPLE, U.S. Pat. No. 5,586,847, Issued on Dec. 24, 1996, to Mattern Jr. et al. teaches a power tool adapter which can be quickly connected and disconnected to a first power-driven rotary bit having an outer periphery that includes an inner sleeve having a first end and a second end. The first end includes an opening for accessing a cavity within the inner sleeve. The sleeve includes at least one radially extending opening. The cavity is sized to complementarily receive at least a portion of the first bit. The first bit is rotatably fixed to the inner sleeve. The second end of the inner sleeve receives at least a portion of a second rotary bit. A locking mechanism is operatively engaged with the inner sleeve. An outer sleeve having a cavity slidably receives at least a portion of the inner sleeve. The outer sleeve is movable from a first position, wherein the outer sleeve maintains the locking mechanism in engagement with the first bit to lock the first bit to the inner sleeve, in a first direction to a second position wherein the locking mechanism is disengaged from the first bit to permit the first bit to be removed from the cavity of the inner sleeve, and from the first position in a second direction to a third position wherein the locking mechanism is removable from the cavity of the inner sleeve to permit the first bit to be installed into the cavity of the inner sleeve. The outer sleeve is biased toward the first position.

A FOURTH EXAMPLE, U.S. Pat. No. 5,876,158, Issued on Mar. 2, 1999, to Beiter teaches a drive collet assembly for an internal thread producing tap. The collet includes a collar that is attached to the stem of the tap using set screws. The collar is received into a recess of the body portion of a drive collet and retained therein using a spring clip. A smaller diameter aperture extends into the body portion above the recess, the aperture receiving a portion of the stem of the tap, the portion has a pair of opposed flats thereon. At least two laterally extending threaded apertures intersect the smaller diameter aperture and each receive a rigid button, a flexible element and a set screw. The set screw can be adjusted to provide a desired breakaway torque which will protect the tap from breakage should an over-torque condition occur. The flexible element will allow the rigid buttons to be forced outwardly so that the drive collet assembly spins freely about the jammed tap, rather than twisting it off. Reversing the direction of the drive will break off the chip or burr or clear the tip of the tap from touching the bottom of the hole and allow the tap to be rotated out of the hole.

A FIFTH EXAMPLE, U.S. Pat. No. 6,543,959, Issued on Apr. 8, 2003, to Jore teaches a two-way quick connector for connecting a power drill to a working tool having a working end and a shank end having a circumferential groove. The connector having a drive shaft with a polygonal-shaped chuck end to be received by the chuck of a power drill, and a cylindrically-shaped opposite end having an axial bore for receiving the shank end of the working tool. The connector further having a ball detent and a two-piece slidable sleeve mounted on the drive shaft, which sleeve may be manipulated in either of two directions to manipulate the ball detent into the circumferential groove of the working tool.

A SIXTH EXAMPLE, U.S. Pat. No. 7,334,970, Issued on Feb. 26, 2008, to Kozak teaches a method and apparatus for forming apertures and inserting fasteners in a workpiece. One embodiment relates generally to a bit holder device for forming apertures and inserting fasteners into a workpiece. This embodiment comprises a tool bit, a hex holder member, an adapter hex member, a double collet member, a collet retention cap and a drill bit. The drill bit is capable of drilling an aperture into a workpiece whereupon the drill bit, the collet retention cap, the double collet member and the adapter hex member are removed from the hex holder member thereby, allowing the tool bit to forcibly insert a fastener into the workpiece.

It is apparent now that numerous innovations for tap holding adaptors for power tool chucks have been provided in the prior art that are adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide an adaptor for holding a threading device that avoids the disadvantages of the prior art.

ANOTHER OBJECT of the present invention is to provide an adaptor for holding a threading device that is simple and inexpensive to manufacture.

STILL ANOTHER OBJECT of the present invention is to provide an adaptor for holding a threading device that is simple to use.

BRIEFLY STATED, STILL YET ANOTHER OBJECT of the present invention is to provide an adaptor for holding a threading device to a chuck of a power tool, with the chuck having three jaws. The adaptor comprises a shank having three flat sides, wherein each flat side of the shank cooperates with a corresponding jaw of the chuck.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 2 is a partial cross sectional view of the first embodiment holding the shank of the tap member therein;

FIG. 3 is an exploded perspective view showing the two components of the first embodiment along with the tap member;

FIG. 4 is a perspective view of the first component of the first embodiment;

FIG. 5 is a side elevational view taken in the direction of arrow 5 in FIG. 4;

FIG. 6 is a cross sectional view taken along line 6-6 in FIG. 4;

FIG. 7 is a partial side elevational view similar to FIG. 5, showing a smaller first component of the first embodiment used with a smaller hand drill;

FIG. 15 is a partial cross sectional view of the second embodiment holding the die member therein;

FIG. 16 is an exploded perspective view showing the second embodiment, the die member and the piece of pipe;

FIG. 17 is a rear perspective view of the second embodiment;

FIG. 18 is a front perspective view of the second embodiment;

FIG. 19 is a top plan view taken in the direction of arrow 19 in FIG. 17;

FIG. 20 is a cross sectional view taken along line 20-20 in FIG. 17;

FIG. 21 is a partial top plan view similar to FIG. 19, showing a smaller second embodiment used with a smaller hand drill;

FIG. 22 is a perspective view of the die member;

FIG. 23 is a front elevational view taken in the direction of arrow 23 in FIG. 22;

FIG. 24 is a side elevational view taken in the direction of arrow 24 in FIG. 23;

FIG. 25 is a rear elevational view taken in the direction of arrow 25 in FIG. 24; and FIG. 26 is a cross sectional view taken along line 26-26 in FIG. 22.

Figure 1:
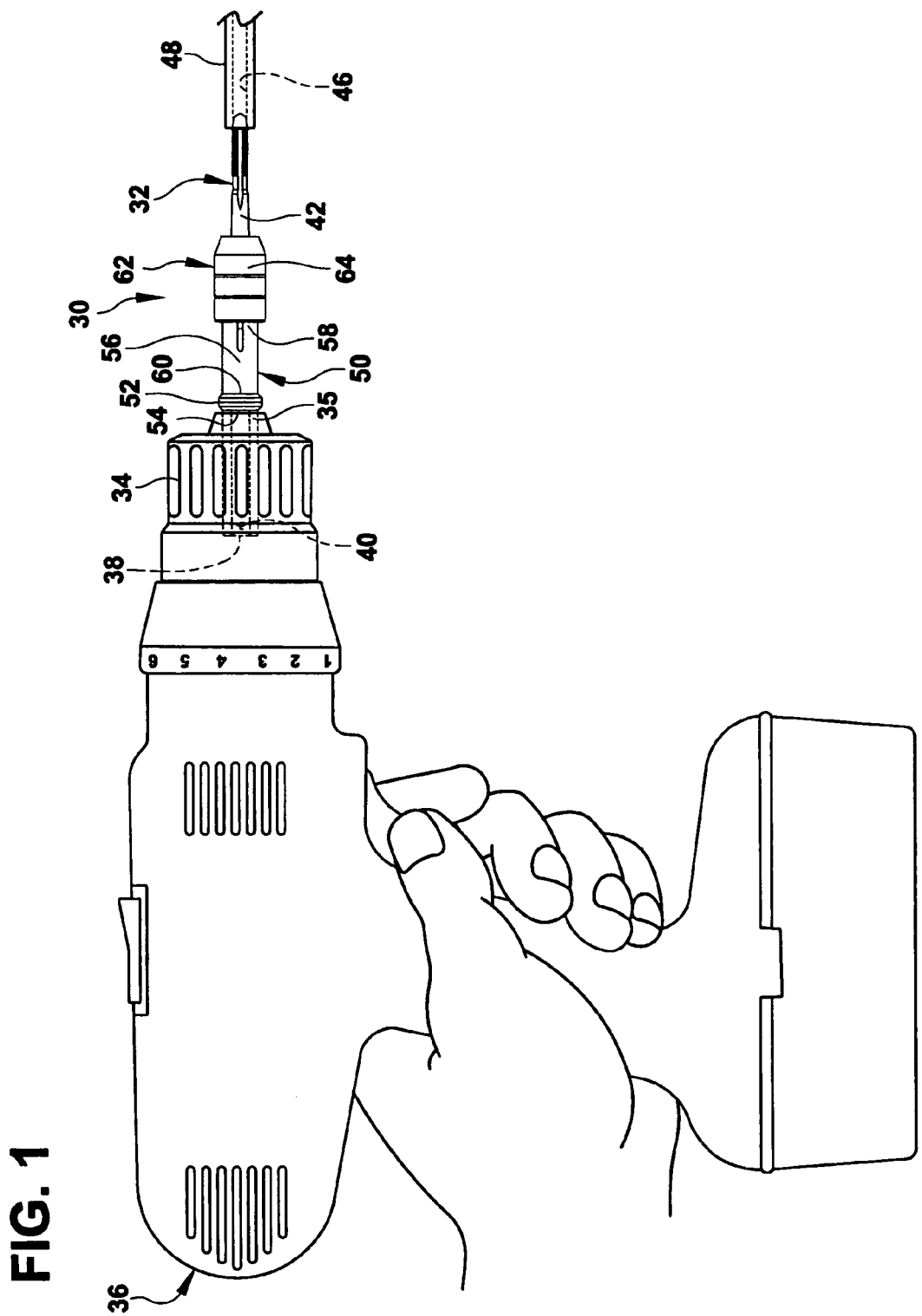
FIG. 1 is an elevational view of a first embodiment of the present invention holding a shank of a tap member and being used with a hand drill for cutting internal threads in a piece of pipe.

A MARSHALING OF REFERENCE NUMERALS UTILIZED IN THE DRAWING 30 adaptor
32 threading device
34 chuck of power tool 36
35 jaw of chuck 34
36 power tool
38 shank of adaptor 30
40 flat side of shank 38
42 tap member for threading device 32
44 four sided end of tap member 42
46 aperture in piece of pipe 48
48 piece of pipe (workpiece)
50 first component of adaptor 30
52 stop ring of first component 50
54 first side of stop ring 52
56 cylindrical shaft of first component 50
58 externally threaded jaw of cylindrical shaft 56
60 second side of stop ring 52
62 second component of adaptor 30
64 internally threaded collar for second component 62
66 die member for threading device 32
68 cylindrical housing of adaptor 30
70 closed first end of cylindrical housing 68
72 open second end of cylindrical housing 68
74 annular seat in cylindrical housing 68
76 opening in annular seat 74
78 set screw of adaptor 30
80 longitudinal aperture in cylindrical housing 68
82 axial bore
84 first portion of axial bore 82
86 second portion of axial bore 82
88 shoulder stop
89 adjacent portion of four sided end 44 of tap member 42
90 axial slots

DETAILED DESCRIPTION OF THE PREFERRED EMBODIMENT

Figure 8:
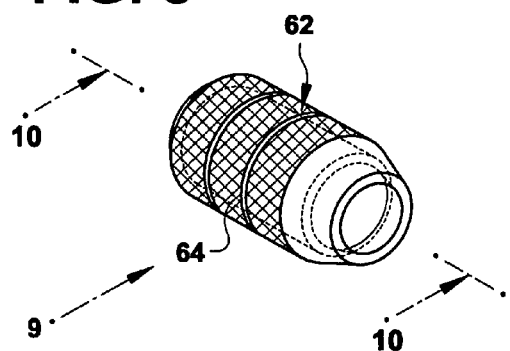
FIG. 8 is a perspective view of the second component of the first embodiment.
Figure 9:
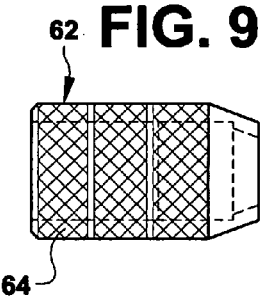
FIG. 9 is a side elevational view taken in the direction of arrow 9 in FIG. 8.
Figure 10:
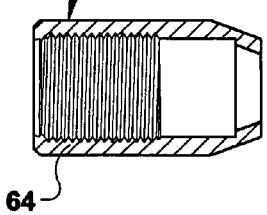
FIG. 10 is a cross sectional view taken along line 10-10 in FIG. 8.
Figure 11:
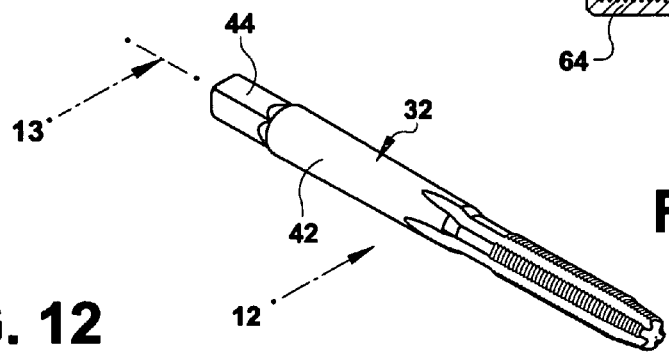
FIG. 11 is a perspective view of the tap member.
Figure 12:
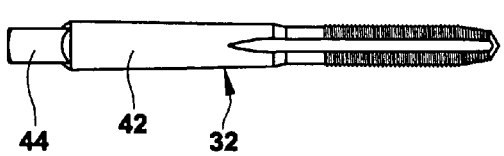
FIG. 12 is a side elevational view taken in the direction of arrow 12 in FIG. 11.
Figure 13:
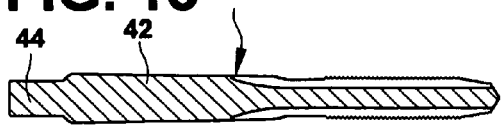
FIG. 13 is a cross sectional view taken along line 13-13 in FIG. 11.
Figure 14:
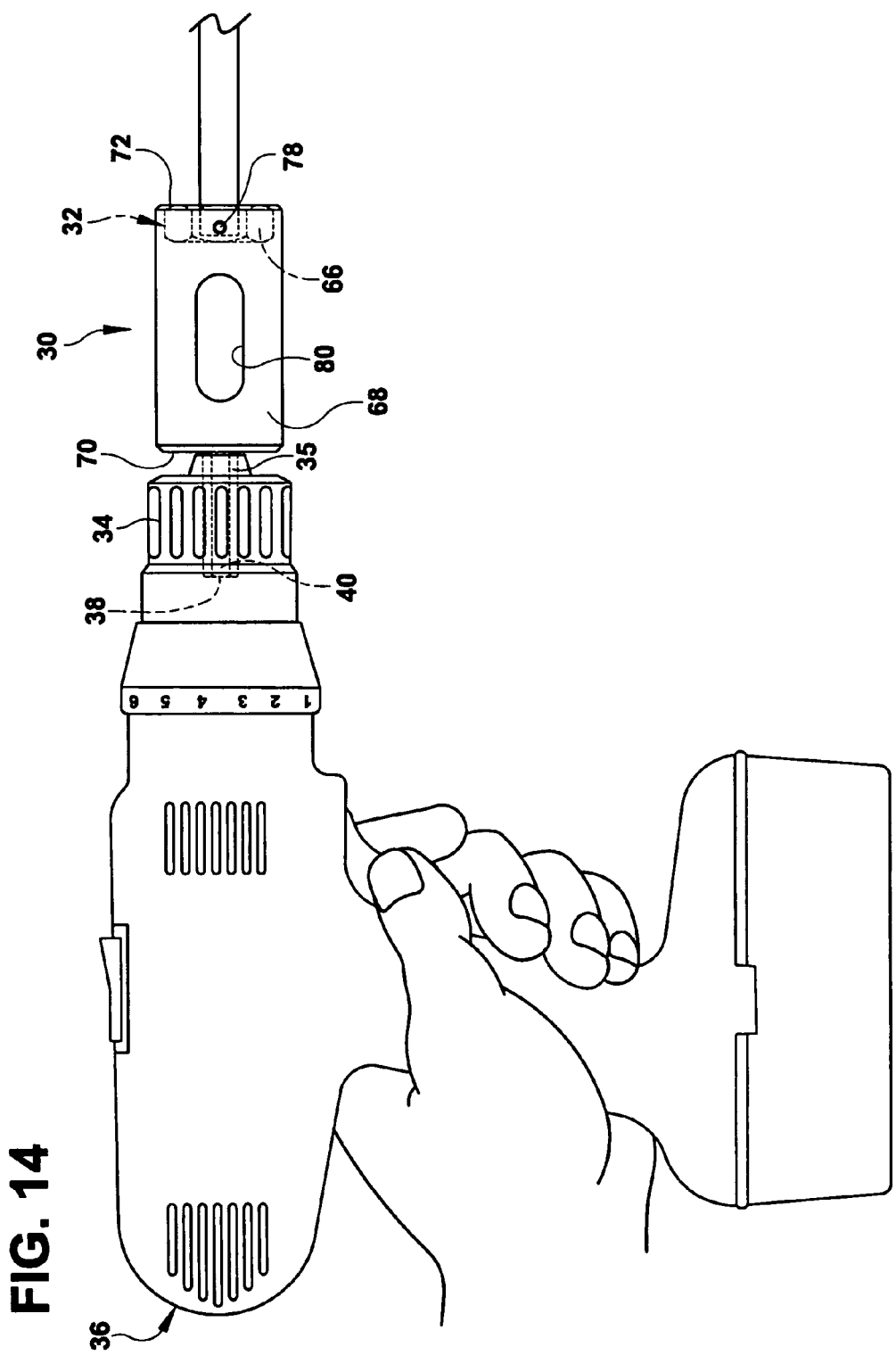
FIG. 14 is an elevational view of a second embodiment of the present invention holding a die member and being used with a hand drill for cutting external threads on a piece of pipe.

Referring now to the figures, in which like numerals indicate like parts, and particularly to FIGS. 1 through 13, which are an elevational view of a first embodiment of the present invention holding a shank of a tap member and being used with a hand drill for cutting internal threads in a piece of pipe; a partial cross sectional view of the first embodiment holding the shank of the tap member therein; an exploded perspective view showing the two components of the first embodiment along with the tap member; a perspective view of the first component of the first embodiment; a side elevational view taken in the direction of arrow 5 in FIG. 4; a cross sectional view taken along line 6-6 in FIG. 4; a partial side elevational view similar to FIG. 5, showing a smaller first component of the first embodiment used with a smaller hand drill; a perspective view of the second component of the first embodiment; a side elevational view taken in the direction of arrow 9 in FIG. 8; a cross sectional view taken along line 10-10 in FIG. 8; a perspective view of the tap member; a side elevational view taken in the direction of arrow 12 in FIG. 11; and a cross sectional view taken along line 13-13 in FIG. 11, and as such, will be discussed with reference thereto.

The present invention is generally an adaptor 30 for holding a threading device 32 to a chuck 34 of a power tool 36, with the chuck 34 having three jaws 35. The adaptor 30 comprises a shank 38 having three flat sides 50. Each flat side 40 of the shank 38 cooperates with a corresponding jaw 35 of the chuck 34.

In the first embodiment the threading device 32 is a tap member 42 having a four sided end 44, wherein the tap member 42 when rotated will make internal threads within an aperture 46 of a workpiece, such as a piece of pipe 48. The adaptor 30 further comprises a first component 50 having a stop ring 52. The shank 38 extends centrally from a first side 54 of the stop ring 52 and a cylindrical shaft 56 having four externally threaded jaws 58 extends from a second side 60 of the stop ring 52. A second component 62 being an internally threaded collar 64 threads onto the four externally threaded jaws 58. When the four sided end 44 of the tap member 42 is inserted between the four externally threaded jaws 58 and the internally threaded collar 64 is tightened on the four externally threaded jaws 58, the four sided end 44 of the tap member 42 will be grasped by the four externally threaded jaws 58 and held in place.

The four externally threaded jaws 58 define an axial bore 82 that replaceably receives the tap member 42, and has a first portion 84 and a second portion 86 that is coaxial with the first portion 84 of the axial bore 82.

The cross section of the first portion 84 of the axial bore 82 is less than the cross section of the second portion 86 of the axial bore 82 so as to form a shoulder stop 88 within the four externally threaded jaws 58.

The first portion 84 of the axial bore 82 replaceably receives the four sided end 44 of the tap member 42, with the shoulder stop 88 having an adjacent portion 89 of the four sided end 44 of the tap member 42 abut thereagainst.

The shoulder stop 88 is conical-frustum-shaped thereby smoothly tapering from the second portion 86 of the axial bore 82 to the first portion 84 of the axial bore 82.

The four externally threaded jaws 58 are separated from each other by axial slots 90.

The axial bore 82 extends further in the cylindrical shaft 56 than does the axial slots 90.

Referring again to the figures, in which like numerals indicate like parts, and particularly to FIGS. 14 through 26 which are an elevational view of a second embodiment of the present invention holding a die member and being used with a hand drill for cutting external threads on a piece of pipe; a partial cross sectional view of the second embodiment holding the die member therein; an exploded perspective view showing the second embodiment, the die member and the piece of pipe; a rear perspective view of the second embodiment; a front perspective view of the second embodiment; a top plan view taken in the direction of arrow 19 in FIG. 17; a cross sectional view taken along line 20-20 in FIG. 17; a partial top plan view similar to FIG. 19, showing a smaller second embodiment used with a smaller hand drill; a perspective view of the die member; a front elevational view taken in the direction of arrow 23 in FIG. 22; a side elevational view taken in the direction of arrow 24 in FIG. 23; a rear elevational view taken in the direction of arrow 25 in FIG. 24; and a cross sectional view taken along line 26-26 in FIG. 22, and as such, will be discussed with reference thereto.

In the second embodiment the threading device 32 is a die member 66, wherein the die member 66 when rotated will make external threads about a cylindrical workpiece, such as the piece of pipe 48. The adaptor 30 further comprises a cylindrical housing 68 having a closed first end 70 and an open second end 72. The shank 38 extends centrally from the closed first end 70, while an annular seat 74 having an opening 76 therein is recessed within the open second end 72 to receive the die member 66. A set screw 78 is threaded into a side of the cylindrical housing 68 near the open second end 72 to engage with a side of the die member 66 and hold the die member 66 in place on the annular seat 74. The cylindrical housing 68 has two oppositely positioned longitudinal apertures 80 therein to allow shavings produced by the die member 66 to exit therefrom.

It will be understood that each of the elements described above, or two or more together, may also find a useful application in other types of constructions differing from the types described above.

While the invention has been illustrated and described as embodiments of an adaptor for holding a threading device, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. An adaptor for holding a threading device to a chuck of a power tool, said adaptor comprising a shank defined by three consecutive flat sides in lateral cross section, wherein said threading device is a tap member having a four sided end, wherein said tap member when rotated will make internal threads within an aperture of a workpiece, and wherein said adaptor further comprises:
   a) a first component having a stop ring,
      wherein said shank extends centrally from a first side of said stop ring and a cylindrical shaft having four externally threaded jaws extends from a second side of said stop ring,
      wherein said stop ring is free of any lateral voids and extends only slightly radially outwardly; and
   b) a second component being an internally threaded collar threads onto said four externally threaded jaws,
      wherein when said four sided end of said tap member is inserted between said four externally threaded jaws and said internally threaded collar is tightened on said four externally threaded jaws, said four sided end of said tap member will be grasped by said four externally threaded jaws and held in place;

wherein said four externally threaded jaws of said cylindrical shaft define an axial bore;

wherein said axial bore defined by said four externally threaded jaws of said cylindrical shaft replaceably receives said tap member;

wherein said axial bore defined by said four externally threaded jaws of said cylindrical shaft has a first portion;

wherein said axial bore defined by said four externally threaded jaws of said cylindrical shaft has a second portion;

wherein said first portion of said axial bore defined by said four externally threaded jaws of said cylindrical shaft is coaxial with said second portion of said axial bore defined by said four externally threaded jaws of said cylindrical shaft;

wherein said first portion of said axial bore defined by said four externally threaded jaws of said cylindrical shaft has a cross section;

wherein said second portion of said axial bore defined by said four externally threaded jaws of said cylindrical shaft has a cross section;

wherein said cross section of said first portion of said axial bore defined by said four externally threaded jaws of said cylindrical shaft is less than said cross section of said second portion of said axial bore defined by said four externally threaded jaws of said cylindrical shaft so as to form a shoulder stop within said four externally threaded jaws of said cylindrical shaft;

wherein said first portion of said axial bore defined by said four externally threaded jaws of said cylindrical shaft replaceably receives said four sided end of said tap member, with said shoulder stop within said four externally threaded jaws of said cylindrical shaft having an adjacent portion of said four sided end of said tap member abut thereagainst;

wherein said shoulder stop is conical-frustum-shaped thereby smoothly tapering from said second portion of said axial bore to said first portion of said axial bore;

wherein said four externally threaded jaws are separated from each other by axial slots; and wherein said axial bore extends further in said cylindrical shaft than does said axial slots.

\* \* \* \* \*